United States Patent
Luo et al.

(10) Patent No.: US 12,253,638 B2
(45) Date of Patent: Mar. 18, 2025

(54) METHOD AND SYSTEM FOR DIRECTLY AND RAPIDLY DETECTING $^{14}C$ OF CARBON DIOXIDE

(71) Applicant: Zhejiang University, Hangzhou (CN)

(72) Inventors: Zhongyang Luo, Hangzhou (CN); Yinchen Wang, Hangzhou (CN); Chunjiang Yu, Hangzhou (CN); Qinhui Wang, Hangzhou (CN)

(73) Assignee: Zhejiang University, Hangzhou (CN)

( * ) Notice: Subject to any disclaimer, the term of this patent is extended or adjusted under 35 U.S.C. 154(b) by 200 days.

(21) Appl. No.: 18/193,940

(22) Filed: Mar. 31, 2023

(65) Prior Publication Data
US 2024/0142643 A1 May 2, 2024

(30) Foreign Application Priority Data
Oct. 28, 2022 (CN) .......................... 202211338253.0

(51) Int. Cl.
*G01T 1/178* (2006.01)
*G01T 1/204* (2006.01)

(52) U.S. Cl.
CPC .............. *G01T 1/204* (2013.01); *G01T 1/178* (2013.01); *G01T 1/2047* (2013.01)

(58) Field of Classification Search
CPC ....... G01T 1/178; G01T 1/204; G01T 1/2042; G01T 1/2047
USPC .................................................. 250/370.11
See application file for complete search history.

(56) References Cited

U.S. PATENT DOCUMENTS

| | | | |
|---|---|---|---|
| 3,944,471 A * | 3/1976 | Waters | C12M 37/04 435/808 |
| 4,918,310 A * | 4/1990 | Rundt | G01T 1/2045 250/362 |
| 5,848,975 A * | 12/1998 | Phillips | A61B 5/0836 600/300 |

(Continued)

FOREIGN PATENT DOCUMENTS

| | | |
|---|---|---|
| CN | 103142232 A | 6/2013 |
| CN | 107894606 A | 4/2018 |

(Continued)

OTHER PUBLICATIONS

Krajcar Bronić et al., Measurement of 14C activity by liquid scintillation counting, Applied Radiation and Isotopes 67 (2009) 800-804. (Year: 2009).*

*Primary Examiner* — Allen C. Ho
(74) *Attorney, Agent, or Firm* — David D. Brush; Westman, Champlin & Koehler, P.A.

(57) ABSTRACT

In the technical field of power generation, a method and system for directly and rapidly detecting $^{14}C$ of carbon dioxide, which can quickly complete a $^{14}C$ activity measurement of carbon dioxide, while further improving uniformity and accuracy for directly and rapidly detecting $^{14}C$ of carbon dioxide. The method includes: pressurizing and liquefying gaseous carbon dioxide to obtain liquid carbon dioxide; mixing the liquid carbon dioxide with a cosolvent and a scintillator in a pressure vessel to obtain a mixed solution; and placing the pressure vessel in a liquid scintillation counter for carrying out radiocarbon activity detection.

8 Claims, 5 Drawing Sheets

(56) References Cited

U.S. PATENT DOCUMENTS

| | | | |
|---|---|---|---|
| 6,265,221 B1* | 7/2001 | Nilsson | G01N 33/497 430/30 |
| 7,291,837 B2* | 11/2007 | Verhagen | G01N 1/2202 250/304 |
| 10,215,667 B1 | 2/2019 | Luo et al. | |
| 10,690,784 B2* | 6/2020 | Luo | G01T 1/2002 |
| 2019/0154848 A1 | 5/2019 | Luo et al. | |

FOREIGN PATENT DOCUMENTS

| CN | 107942368 A | 4/2018 |
|---|---|---|
| CN | 107976342 A | 5/2018 |
| CN | 111722262 A | 9/2020 |

\* cited by examiner

METHOD AND SYSTEM FOR DIRECTLY AND RAPIDLY DETECTING $^{14}C$ OF CARBON DIOXIDE

TECHNICAL FIELD

The present invention relates to the technical field of power generation, in particular to a method and system for directly and rapidly detecting $^{14}C$ of carbon dioxide.

BACKGROUND ART

At present, coal is still the main source of energy for the power generation industry. Under the guidance of the dual carbon industry policy, the coupling of biomass and coal for power generation will be developed rapidly. The accurate measurement of the blending ratio of the biomass has always been a major issue in the field of mixed-combustion power generation.

Measurement of radiocarbon ($^{14}C$) is an effective technical means for determining the blending ratio of the biomass and the coal coupled for power generation, and the liquid scintillation counting test is the most common way to test $^{14}C$. In the prior art, it is usually necessary to convert carbon dioxide to be measured in flue gas into benzene so that detection of $^{14}C$ can be performed, this is because benzene is the most carbon-enriched liquid substance and the accuracy of the liquid scintillation counting test is positively correlated with the carbon enrichment degree of a sample to be measured. However, converting the carbon dioxide to be measured into benzene requires a series of complex process including high temperature reduction, hydrolysis and catalytic polymerization, the sample preparation time of a single sample is long, and the conversion rate is low.

In this regard, in the prior application CN107942368A, the inventor has put forwards that the step of converting $CO_2$ into benzene in the prior art can be replaced by pressurizing and liquefying $CO_2$, thereby improving the conversion rate and shortening the detecting time, and improving the timeliness of determining the biomass blending ratio. However, in the conventional mixed system for detecting $^{14}C$ activity, benzene and a scintillator can be mutually dissolved sufficiently, while liquid carbon dioxide and the scintillator cannot form a uniform mixed system, which affects the detection efficiency and accuracy.

SUMMARY OF THE INVENTION

An exemplary embodiment of the present invention provides a method and system for directly and rapidly detecting $^{14}C$ of carbon dioxide, which can quickly form a uniformly mixed sample for a scintillation counting test and complete $^{14}C$ activity detection near a sampling point of flue gas carbon dioxide, and then complete the determination of the biomass blending ratio, thereby improving the detection efficiency and accuracy for measuring $^{14}C$ of carbon dioxide, and enhancing the timeliness of determining the biomass blending ratio.

In the first aspect, the present invention provides a method for directly and rapidly detecting $^{14}C$ of carbon dioxide, including the following steps of: a pressurizing step for pressurizing and liquefying gaseous carbon dioxide to obtain liquid carbon dioxide; a mixing step for mixing the liquid carbon dioxide with a co solvent and a scintillator in a pressure vessel to obtain a mixed solution; and a detecting step for placing the pressure vessel in a liquid scintillation counter for carrying out radiocarbon activity detection.

According to the technical solution, firstly, enrichment of carbon is accomplished by pressurizing the carbon dioxide into carbon dioxide in a liquid phase state, which significantly shortens the time required for the carbon enrichment process, completes the measurement of $^{14}C$ of carbon dioxide in flue gas within 1-3 hours and performs the calculation of the biomass blending ratio. This greatly improves the timeliness compared to the benzene sample preparation time of at least 24 hours in the original method.

Secondly, the accuracy of a liquid scintillation counting test is highly dependent on the enrichment degree of carbon per unit volume of test samples, the higher the enrichment degree of carbon per unit volume of the test samples, the higher the accuracy of the test. By adding the cosolvent into the liquid carbon dioxide, the enrichment amount of carbon per unit volume of the liquid carbon dioxide in an obtained mixed system can reach 165-175 mg/mL, which can reduce the detection error, uncertainty and lower the limit of detection. Therefore, treating carbon dioxide into the liquid carbon dioxide for carrying out $^{14}C$ measurement can achieve high accurate determination of the biomass blending ratio.

Finally, by mixing the liquid carbon dioxide with the cosolvent and the scintillator, the cosolvent can dissolve the scintillator, thus solving the problem of poor mutual solubility of the liquid carbon dioxide with the scintillator, achieving uniform mixing of the liquid carbon dioxide with the scintillator and ensuring the accuracy of radiocarbon detection.

As an exemplary technical solution, the mixing step includes the following sub-steps of: a first mixing step for mixing the cosolvent and the scintillator to obtain a premixed solution; and a second mixing step for mixing the premixed solution with the liquid carbon dioxide in the pressure vessel to obtain the mixed solution.

According to the technical solution, since the liquid carbon dioxide is placed inside the pressure vessel, and it is difficult to inject liquid into the pressure vessel in a high pressure state, the scintillator and the cosolvent are firstly mixed to obtain the premixed solution in which the scintillator and the cosolvent are mutually dissolved, so that the premixed solution can be directly injected into the liquid carbon dioxide in the subsequent process, without injecting the liquid many times; and since the scintillator can be dissolved in the cosolvent, premixing can make the scintillator and the cosolvent mutually dissolved sufficiently, so that the uniformity of the obtained mixed solution can be improved, further improving the accuracy of $^{14}C$ activity detection.

As an exemplary technical solution, in the first mixing step, a mixing ratio of the scintillator to the cosolvent is 12-15 mg/mL.

According to the technical solution, by researches, the inventor has found that too much cosolvent may result in a lower content of the scintillator in the mixed solution and also result in a lower enrichment degree of carbon; too little cosolvent does not allow the scintillator to mix uniformly with the liquid carbon dioxide. However, when the mixing ratio of the scintillator to the cosolvent is in the range of 12-15 mg/mL, the scintillator and the liquid carbon dioxide can be uniformly mixed in the cosolvent, at the same time, the content of the scintillator in the mixed solution is moderate, and the detection result of $^{14}C$ has higher accuracy.

As an exemplary technical solution, in the first mixing step, the scintillator is an organic solid scintillator, the cosolvent is an organic solvent, and the $^{14}C$ activity of a carbon element in both the scintillator and the cosolvent is zero.

According to the technical solution, in a high-pressure environment, the liquid carbon dioxide and the organic solvent have good mutual solubility, and can be naturally mixed and dissolved without mixing methods such as stirring, heating and oscillating, and the organic solid scintillator can also be dissolved in the organic solvent, so that a uniform mixed system under a high-pressure condition can be formed. Furthermore, the use of the scintillator and the cosolvent with the $^{14}C$ activity of zero avoids the situation that external $^{14}C$ is introduced into the mixed system, causing contamination.

As an exemplary technical solution, in the second mixing step, a volume ratio of the premixed solution to the liquid carbon dioxide is 1:5 to 1:6.

According to the technical solution, the range of the ratio of the premixed solution to the liquid carbon dioxide depends on two aspects, in the first aspect, the ratio of the liquid carbon dioxide to the scintillator needs to be in a suitable range so as to ensure that the decay energy of radiocarbon in the liquid carbon dioxide can enable scintillator molecules to emit fluorescent light; in the second aspect, the ratio of the liquid carbon dioxide to the cosolvent needs to be in a suitable range to ensure that the cosolvent can be uniformly dissolved in the liquid carbon dioxide to be uniformly mixed with the scintillator which is also dissolved in the liquid carbon dioxide to ensure the enrichment degree of carbon as much as possible. By researches, the inventor has found that when the volume ratio of the premixed solution to the liquid carbon dioxide is in the range of 1:5 to 1:6, factors in both the aspects can be taken into consideration to ensure uniform mixing of the scintillator and the liquid carbon dioxide at a suitable ratio.

As an exemplary technical solution, in the pressurizing step, the pressurizing rate of the gaseous carbon dioxide is controlled according to the temperature and pressure of the liquid carbon dioxide.

According to the technical solution, if the pressurizing rate of the carbon dioxide is too high, a large amount of carbon dioxide may be accumulated instantaneously in the pressure vessel, resulting in rapid liquefaction of the carbon dioxide, a large amount of heat may be emitted, and finally the liquid carbon dioxide may be changed into carbon dioxide in a supercritical state or the density thereof may be greatly reduced compared with that of the liquid state, thereby reducing the test accuracy. By detecting the temperature in the pressure vessel in the pressurizing process and controlling the pressurizing rate based on the temperature, it can be avoided that the temperature in the pressure vessel is too high, so that the process of pressurizing and liquefying the carbon dioxide is more safe and reliable.

In the second aspect, the present invention further provides a system for directly and rapidly detecting $^{14}C$ of carbon dioxide, the detecting system including: a $^{14}C$ detecting device, the $^{14}C$ detecting device being a pressure vessel having light-transmitting zones for containing a mixed solution of liquid carbon dioxide with a scintillator; a pressurizing system, in communication with the $^{14}C$ detecting device for pressurizing and liquefying gaseous carbon dioxide into the liquid carbon dioxide and introducing the liquid carbon dioxide into the $^{14}C$ detecting device; a mixed solution adding system, in communication with the $^{14}C$ detecting device for premixing the scintillator and a cosolvent and introducing a premixed solution of the scintillator and the cosolvent into the $^{14}C$ detecting device; and a liquid scintillation counter, having a sample cell and a measurement cavity suitable for the $^{14}C$ detecting device to be placed in, the liquid scintillation counter using the light-transmitting zone of the $^{14}C$ detecting device for carrying out radiocarbon activity detection.

According to the technical solution, the system for directly and rapidly detecting $^{14}C$ of carbon dioxide can quickly form a uniformly mixed sample for a scintillation counting test near a sampling point of flue gas carbon dioxide, which improves the detection efficiency and accuracy for measuring $^{14}C$ in carbon dioxide.

As an exemplary technical solution, the system for directly and rapidly detecting $^{14}C$ of carbon dioxide further includes a pretreating system, in communication with a gas source of the gaseous carbon dioxide and the pressurizing system for removing impurities of and purifying a gaseous carbon dioxide sample collected from the gas source of the gaseous carbon dioxide and then introducing same into the pressurizing system.

According to the technical solution, the pretreating system can remove impurities in the gaseous carbon dioxide to avoid that other impurities in the carbon dioxide affect the measurement result.

As an exemplary technical solution, the $^{14}C$ detecting device includes a pressure-bearing housing, the pressure-bearing housing defining and forming a light-transmitting cylindrical cavity; pressure-bearing plates, the pressure-bearing plates being respectively disposed on an upper bottom surface and a lower bottom surface of the cylindrical cavity; fixing tie bars, two ends of the plurality of fixing tie bars being respectively fixed to the pressure-bearing plates on the upper bottom surface and the lower bottom surface of the cylindrical cavity; and a cooling water channel, disposed inside at least one of the pressure-bearing plates.

According to the technical solution, the $^{14}C$ detecting device is in an integral cylinder design, the light-transmitting pressure-bearing housing is on the side wall, the pressure-bearing plates are on the upper and lower bottom surfaces and are fixed and sealed by means of the fixing tie bars, so that high-pressure carbon dioxide can safely and stably exist in the $^{14}C$ detecting device. Moreover, fluorescent light emitted by $^{14}C$ of the liquid carbon dioxide after decay and scintillator molecules can transmit through the pressure-bearing housing to be captured and recorded by photomultipliers of the liquid scintillation counter, so as to test the activity intensity of radiocarbon of the carbon dioxide sample.

In addition, the cooling water channel is disposed in at least one of the pressure-bearing plates, and by introducing a cooling medium having different temperatures into the cooling water channel, it is possible to lower the temperature of the liquid carbon dioxide in the $^{14}C$ detecting device, absorb a large amount of heat generated by the liquefaction of carbon dioxide, and at the same time, promote the conversion of gas-phase carbon dioxide into liquid-phase carbon dioxide, thereby improving the density of the liquid carbon dioxide.

As an exemplary technical solution, the $^{14}C$ detecting device further includes a temperature detector disposed within the cylindrical cavity; the pressurizing system further includes a pressure detector and a pressure control device, the pressure control device controlling the pressurizing rate of the pressurizing system based on detection results of the temperature detector and the pressure detector.

According to the technical solution, the temperature detector can be used to detect the temperature in the $^{14}C$ detecting device in the pressurizing process, and the pressure detector can detect the pressure in the pressurizing system; based on the pressurizing rate in the pressurizing system and the temperature condition of the $^{14}C$ detecting device, if the pressurizing rate in the pressurizing system is high and the temperature of the $^{14}C$ detecting device is high, the pressurizing rate of the pressurizing system is reduced by the pressure control device; if the pressurizing rate in the pressurizing system is low and the temperature of the $^{14}C$ detecting device is low, the pressurizing rate of the pressurizing system is increased by the pressure control device.

LIST OF REFERENCE NUMERALS

100—carbon enrichment unit; 200—detecting unit; 300—liquid scintillation counter;
1—$^{14}C$ detecting device;
11—cylindrical cavity; 111—upper bottom surface; 112—lower bottom surface; 12—pressure-bearing housing; 13—fixing nut; 14—high-pressure needle valve; 15—fixing tie bar; 16—pressure-bearing plate; 161—cooling water channel; 17—temperature detector;
2—pressurizing system;
21—pressurizing pump; 22—high-pressure valve; 23—pressure-bearing pipeline; 24—pressure detector; 25—pressure control device;
3—mixed solution adding system;
31—premixing cavity; 32—mixed solution adding valve; 33—vacuum valve; 34—vacuum pump;
4—pretreating system;
41—vacuum pump; 42—gaseous carbon dioxide gas source; 43—gas valve; 44—solid phase impurity removing system; 45—gas phase impurity removing system; 46—mass flow controller.

DETAILED DESCRIPTION

The technical solutions in embodiments of the present invention will be clearly and completely described below with reference to the accompanying drawings in the embodiments of the present invention. Apparently, the described embodiments are merely some rather than all of the embodiments of the present invention. All other embodiments obtained by a person of ordinary skill in the art based on the embodiments in the present invention without creative efforts shall fall within the protection scope of the present invention.

First Embodiment

Figure 1:
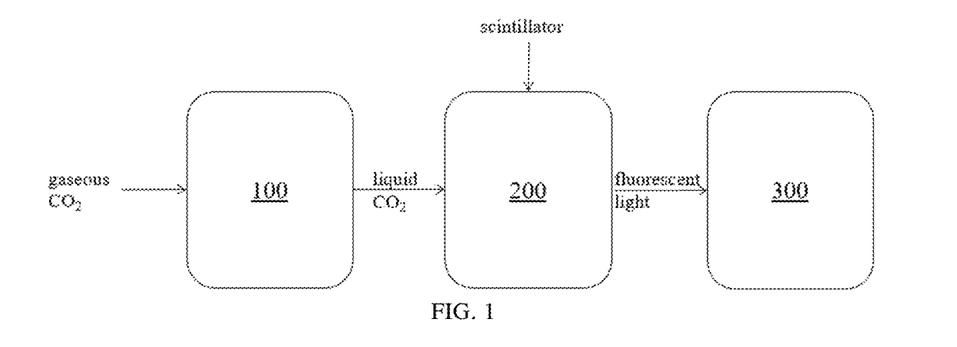
FIG. 1 is a schematic diagram of a system for detecting $^{14}C$ to which the first embodiment of the present invention is applicable.

FIG. 1 shows a schematic diagram of a system for detecting $^{14}C$ to which this embodiment is applicable; by taking the detecting system in FIG. 1 as an example for illustration, gaseous carbon dioxide enters a carbon enrichment unit 100, and is converted into liquid-phase carbon dioxide with a higher degree of carbon enrichment, and then the enriched liquid-phase carbon dioxide enters a detecting unit 200. A scintillator absorbs decay energy released by radiocarbon and then emits fluorescent light. The fluorescent light is captured by a liquid scintillation counter 300, and the $^{14}C$ content of the liquid carbon dioxide is measured. The degree of enrichment of carbon dioxide in the carbon enrichment unit 100 and the mixing uniformity of the liquid-phase carbon dioxide and the scintillator determine the accuracy of $^{14}C$ activity detection; the carbon enrichment process of the gaseous carbon dioxide will affect the overall device complexity of the detecting system and the sample preparation and detection time.

In this embodiment, the carbon enrichment unit 100 is typically disposed near a sampling point, for example, after enriching collected carbon dioxide in flue gas near the sampling point, delivering same to a laboratory for carrying out $^{14}C$ scintillation counting detection or implementing $^{14}C$ scintillation counting detection locally at the sampling point.

Figure 2:
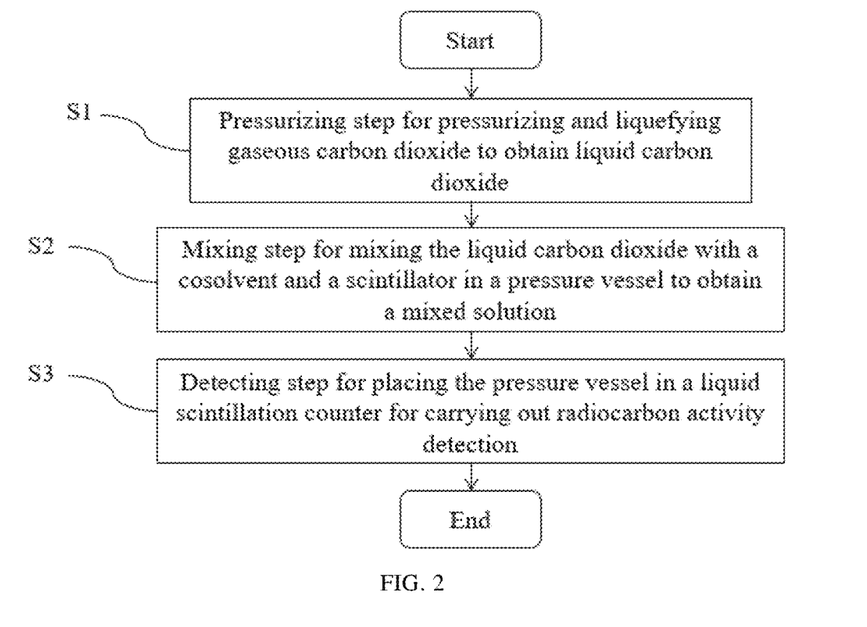
FIG. 2 is a flowchart of a method for directly and rapidly detecting $^{14}C$ of carbon dioxide provided by the first embodiment of the present invention.

The first embodiment of the present invention provides a method for directly and rapidly detecting $^{14}C$ of carbon dioxide; FIG. 2 is a flowchart of the method for directly and rapidly detecting $^{14}C$ of carbon dioxide provided by this embodiment.

As shown in FIG. 2, the method for directly and rapidly detecting $^{14}C$ of carbon dioxide provided by this embodiment includes the following steps of:

a pressurizing step S1 for pressurizing and liquefying gaseous carbon dioxide to obtain liquid carbon dioxide;

a mixing step S2 for mixing the liquid carbon dioxide with a cosolvent and a scintillator in a pressure vessel to obtain a mixed solution; and a detecting step S3 for placing the pressure vessel in the liquid scintillation counter 300 for carrying out radiocarbon activity detection.

The "cosolvent" refers to a reagent capable of promoting the mutual solubility of the liquid carbon dioxide with the scintillator, and the specific type of the "cosolvent" is not limited, and may be a solvent capable of simultaneously dissolving the liquid carbon dioxide and the scintillator, or may be a reagent capable of changing the solubility of the scintillator in the liquid carbon dioxide. The use of the cosolvent can improve the mutual solubility and mixing uniformity of the liquid carbon dioxide with the scintillator, thereby ensuring a liquid scintillation counting test of the liquid carbon dioxide to be carried out smoothly. In an exemplary embodiment, the scintillator is an organic solid scintillator and the cosolvent is an organic solvent. In a high-pressure environment, the liquid carbon dioxide and the organic solvent have good mutual solubility, and can be naturally mixed and dissolved without mixing methods such as stirring, heating and oscillating, and the organic solid scintillator can also be dissolved in the organic solvent, so that a uniform mixed system under a high-pressure condition can be formed.

Further in an exemplary embodiment, the organic solid scintillator is 2-(4'-tert-butylphenyl)-5-(4''-biphenyl)-1,3,4-oxadiazole, or 2,5-diphenyloxazole and the cosolvent is toluene. Toluene is readily available as a common organic solvent and has good solubility with both the scintillator (2-(4'-tert-butylphenyl)-5-(4''-biphenyl)-1,3,4-oxadiazole, or 2,5-diphenyloxazole) and the liquid carbon dioxide.

The "pressure vessel" refers to a closed vessel capable of withstanding the pressure required to liquefy carbon dioxide in the detecting unit 200, and the shape and size thereof are not limited, and can be applicable to an existing liquid scintillation counter or a novel liquid scintillation counter which has been designed and transformed. The carbon enrichment method used in this embodiment is to pressurize and liquefy the gaseous carbon dioxide, and a carbon enrichment substance injected into the detecting unit 200 by the carbon enrichment unit 100 is high-pressure liquid carbon dioxide. The detecting unit 200 in this embodiment includes a closed vessel capable of withstanding pressure for containing and mixing the liquid carbon dioxide in a high-pressure state and the scintillator.

Specifically, in conjunction with FIG. 1 and FIG. 2, in the carbon enrichment unit 100, the pressurizing step S1 is performed, the gaseous carbon dioxide is pressurized and liquefied to form the liquid carbon dioxide so as to complete enrichment of carbon, the time required for the carbon enrichment process and the complexity of a device are greatly reduced, the $^{14}C$ measurement of carbon dioxide in flue gas can be completed within 1-3 hours, thereby rapidly completing the determination of a biomass blending ratio, and the timeliness is greatly improved compared with the benzene sample preparation time of at least 24 hours in the existing method. In addition, the enrichment amount of carbon per unit volume of the liquid carbon dioxide can reach 165-175 mg/mL, which can reduce the detection error, uncertainty and lower the limit of detection; therefore, treating carbon dioxide into the liquid carbon dioxide for carrying out $^{14}C$ measurement can also achieve high accurate determination of the biomass blending ratio.

Next, the mixing step S2 is performed in the detecting unit 200, and the enriched liquid carbon dioxide is mixed with the cosolvent and the scintillator in the detecting unit 200, and under the action of the cosolvent, the scintillator and the liquid carbon dioxide can form a uniform mixed system. In an exemplary embodiment, the $^{14}C$ activity of a carbon element in both the scintillator and the cosolvent is zero. For example, the scintillator and the cosolvent produced from a fossil carbon source can be selected to avoid the situation that $^{14}C$ is introduced into the mixed system, causing contamination.

Finally, the detecting step S3 is performed, after the $^{14}C$ of the liquid carbon dioxide decays, the decay energy thereof is absorbed by scintillator molecules, the scintillator molecules absorb the decay energy and then transition from a ground state to an excited state, and when the molecules are de-excited, the energy thereof is released in a form of emitting fluorescent light, and the fluorescent light is captured and recorded by photomultipliers of the liquid scintillation counter 300, so as to determine the activity intensity of radiocarbon of a carbon dioxide sample, and the uniform mixed system can effectively ensure the correlation between the decay of $^{14}C$ and the release of the fluorescent light, which improves the accuracy of $^{14}C$ activity detection.

In the pressurizing process of the pressurizing step S1, if the pressurizing rate of the carbon dioxide is too high, a large amount of carbon dioxide may be accumulated instantaneously in the pressure vessel, resulting in rapid liquefaction of the carbon dioxide, a large amount of heat may be released, and finally the liquid carbon dioxide may be changed into carbon dioxide in a supercritical state or the density thereof may be greatly reduced compared with that of the liquid state, thereby reducing the test accuracy. Therefore, in an exemplary embodiment of the present invention, in the pressurizing step S1, the pressurizing rate of the gaseous carbon dioxide can be controlled according to the temperature and pressure of the liquid carbon dioxide, so that it is possible to prevent the temperature in the pressure vessel from being excessively high, thereby making the process of pressurizing and liquefying carbon dioxide more safe and reliable and obtaining liquid-phase carbon dioxide with a greater degree of carbon enrichment.

Figure 3:
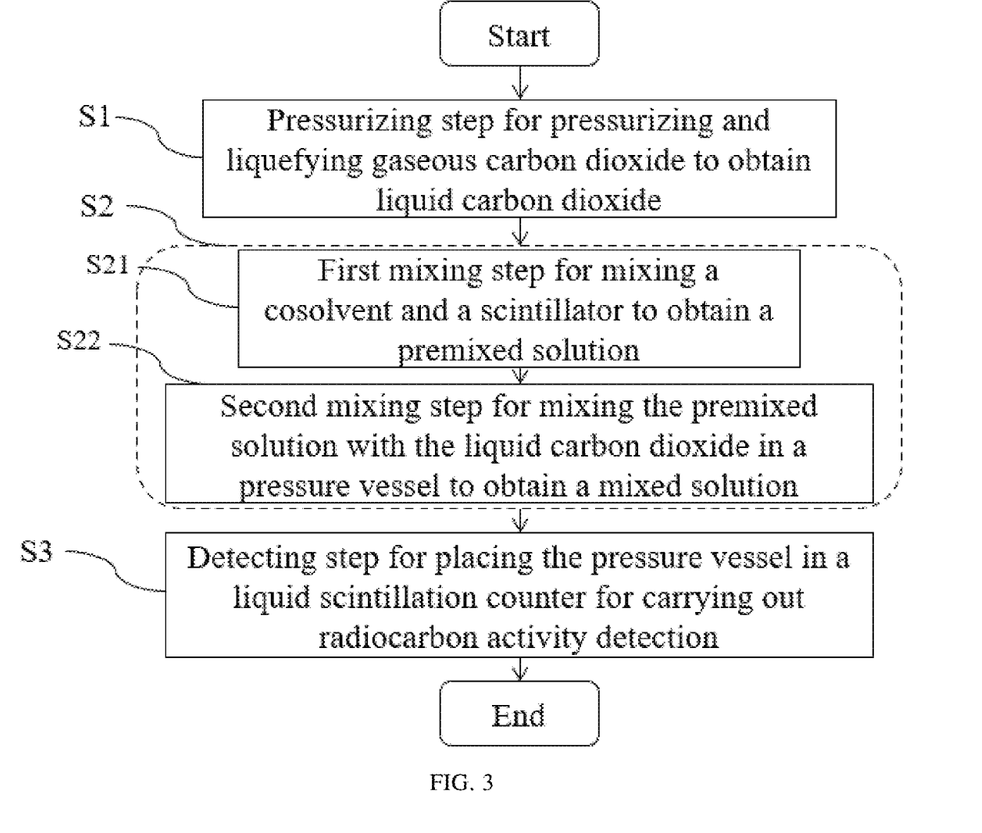
FIG. 3 is an exemplary method for directly and rapidly detecting $^{14}C$ of carbon dioxide provided by the first embodiment of the present invention.

FIG. 3 is an exemplary method for directly and rapidly detecting $^{14}C$ of carbon dioxide provided by the first embodiment of the present invention. As shown in FIG. 3, the mixing step S2 includes the following sub-steps of: a first mixing step S21 for mixing the cosolvent and the scintillator to obtain a premixed solution; and a second mixing step S22 for mixing the premixed solution with the liquid carbon dioxide in the pressure vessel to obtain the mixed solution.

Specifically, in conjunction with FIG. 1 and FIG. 3, in the mixing step S2, since the liquid carbon dioxide is placed inside the pressure vessel, and it is difficult to inject liquid into the pressure vessel in a high pressure state, the first mixing step S21 is firstly performed, the scintillator and the cosolvent are mixed outside the detecting unit 200 to obtain the premixed solution in which the scintillator and the cosolvent are mutually dissolved; then the second mixing step S22 is performed, and the mixed solution of the scintillator, the cosolvent and the liquid carbon dioxide can be obtained by directly injecting the premixed solution into the liquid carbon dioxide. It is not needed to inject liquid many time, and since the scintillator can be dissolved in the cosolvent, premixing can make the scintillator and the cosolvent mutually dissolved sufficiently, so that the uniformity of the obtained mixed solution can be improved, further improving the accuracy of $^{14}C$ activity detection.

In an exemplary embodiment, in the first mixing step S21, a mixing ratio of the scintillator to the cosolvent is 12-15 mg/mL. By researches, the inventor has found that too much cosolvent may result in a lower content of the scintillator in the mixed solution and also result in a lower enrichment degree of carbon; too little cosolvent does not allow the scintillator to be mixed uniformly with the liquid carbon dioxide. However, when the mixing ratio of the scintillator to the cosolvent is in the range of 12-15 mg/mL, the scintillator and the liquid carbon dioxide can be uniformly mixed in the cosolvent, at the same time, the content of the scintillator in the mixed solution is moderate, and the detection result of $^{14}C$ has higher accuracy.

Further in an exemplary embodiment, in the second mixing step S22, a volume ratio of the premixed solution to the liquid carbon dioxide is 1:5 to 1:6. The range of the ratio of the premixed solution to the liquid carbon dioxide depends on two aspects, in the first aspect, the ratio of the liquid carbon dioxide to the scintillator needs to be in a suitable range so as to ensure that the decay energy released by radiocarbon in the liquid carbon dioxide can enable the scintillator to emit fluorescent light; in the second aspect, the ratio of the liquid carbon dioxide to the cosolvent needs to be in a suitable range to ensure that the liquid carbon dioxide and the cosolvent can be dissolved to each other uniformly to be uniformly mixed with the scintillator, wherein the scintillator and the cosolvent are also dissolved to each other. By researches, the inventor has found that when the volume ratio of the premixed solution to the liquid carbon dioxide is in the range of 1:5 to 1:6, factors in both the aspects can be taken into consideration to ensure uniform mixing of the scintillator and the liquid carbon dioxide at a suitable ratio.

In this embodiment, firstly, enrichment of carbon is accomplished by pressurizing the carbon dioxide into carbon dioxide in a liquid phase state, which significantly shortens the time required for the carbon enrichment process, and completes the measurement of $^{14}C$ of carbon dioxide in flue gas within 1-3 hours, thereby rapidly completing the determination of the biomass blending ratio.

Secondly, the accuracy of the liquid scintillation counting test is highly dependent on the enrichment degree of carbon per unit volume of test samples, the higher the enrichment degree of carbon per unit volume of the test samples, the higher the accuracy of the test. By adding the cosolvent into the liquid carbon dioxide, the enrichment amount of carbon per unit volume of the liquid carbon dioxide in an obtained mixed system can reach 165-175 mg/mL, which can reduce the detection error, uncertainty and lower the limit of detection. Therefore, treating carbon dioxide into the liquid carbon dioxide for carrying out $^{14}C$ measurement can achieve high accurate determination of the biomass blending ratio.

Finally, by mixing the liquid carbon dioxide with the cosolvent and the scintillator, the cosolvent can dissolve the scintillator, thus solving the problem of poor mutual solubility of the liquid carbon dioxide and the scintillator; further, the types and ratios of the scintillator and the cosolvent are provided, achieving uniform mixing of the liquid carbon dioxide with the scintillator and improving the detection uniformity and accuracy of radiocarbon.

Test Case

In the test case, 2-(4'-tert-butylphenyl)-5-(4"-biphenyl)-1,3,4-oxadiazole (Bulty-PBD) is selected as the organic solid scintillator, and toluene is selected as the cosolvent. The mixing ratio of the scintillator to the cosolvent of toluene is 15 mg/mL, and the volume ratio of the premixed solution to the liquid carbon dioxide is 1:5.

Test procedure: after vertically connecting a pressure vessel with a visual window to a detachable sampling vessel, firstly, the premixed solution of toluene of a certain volume (⅙ of the total volume of the vessel) with the scintillator is placed in the pressure vessel (the mixing ratio of the scintillator to toluene is 15 mg/mL), a certain amount of carbon dioxide is injected by pressurizing to a given pressure, and the theoretical mass mixing ratio of the carbon dioxide to the premixed solution is calculated according to the temperature, pressure and volume of the pressure vessel; after uniformly mixing same, the sampler is dismantled, the total mass of sample taken outs is calculated according to the mass difference of the sampler before and after sampling, then the liquid carbon dioxide in a sampling cavity is released into a measurement cavity with known volume and measurable temperature and pressure, the mass of carbon dioxide in the sample is calculated according to the temperature, pressure and volume of the cavity, and then the mass of the premixed solution in the sample is calculated. By comparing the mixing ratio of the liquid carbon dioxide in the sample taken out to the premixed solution with a theoretical value of the ratio of the two in the vessel, the mixing uniformity of the liquid carbon dioxide with the scintillator can be verified.

Test results are as shown in Table 1, being data of three sets of mixing experiments. The results show that when the pressure of the mixed system is 7.5-8.5 MPa, the liquid carbon dioxide can be uniformly mixed with the premixed solution, and the actual mass ratio of the sampled liquid carbon dioxide to the premixed solution agrees well with the theoretical mass ratio.

In addition, in the experiment process, it can be seen through visual observation of the visual window that the liquid carbon dioxide and the premixed solution can be uniformly mixed into one solution, and the solution is clear and transparent, which visually shows that the detecting method proposed in this embodiment can achieve the uniformity and stability of the mixed system of the liquid carbon dioxide with the scintillator. In addition, in the pressurizing process of carbon dioxide, the amount of the liquid carbon dioxide gradually increases, and carbon dioxide and the premixed solution of toluene and the scintillator can directly be mutually dissolved uniformly in the liquefaction process, without the need of stirring, heating and other measures to promote mutual solubility.

TABLE 1

| Group | Pressure (MPa) | Mass of the sampler (g) | Mass after sampling (g) | Mixed solution (g) | Mass of $CO_2$ (g) | Premixed solution (mg) | Mass ratio | Theoretical mass ratio |
| --- | --- | --- | --- | --- | --- | --- | --- | --- |
| 1 | 8.51 | 448.821 | 471.319 | 22.498 | 18.283 | 4.215 | 4.338 | 4.326 |
| 2 | 8.02 | 448.820 | 470.833 | 22.013 | 17.792 | 4.221 | 4.215 | 4.228 |
| 3 | 7.50 | 448.822 | 470.784 | 21.962 | 17.738 | 4.224 | 4.199 | 4.087 |

Second Embodiment

The second embodiment of the present invention provides a system for directly and rapidly detecting $^{14}C$ of carbon dioxide. The system for directly and rapidly detecting $^{14}C$ of carbon dioxide provided by this embodiment can perform the method for directly and rapidly detecting $^{14}C$ of carbon dioxide in the first embodiment.

Figure 4:
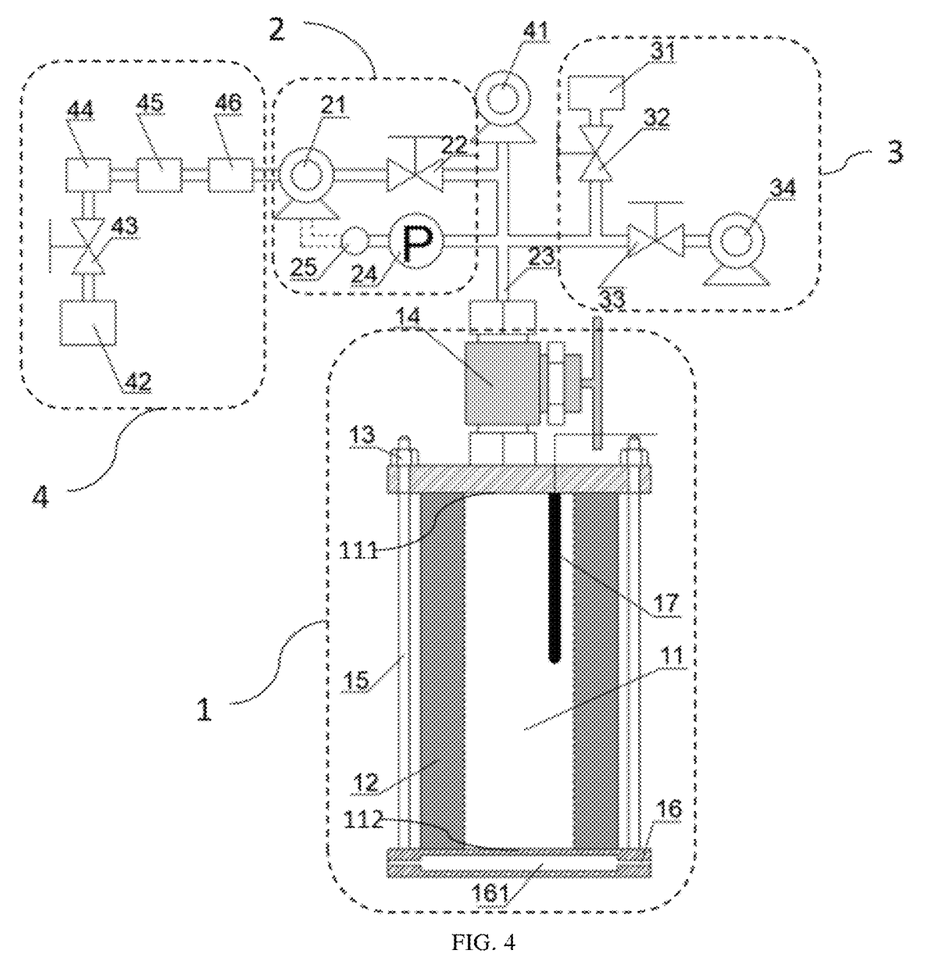
FIG. 4 is a structural schematic view of a system for directly and rapidly detecting $^{14}C$ of carbon dioxide provided by the second embodiment of the present invention.

FIG. 4 is a structural schematic diagram of the detecting system provided by this embodiment. As shown in FIG. 4, the detecting system provided by this embodiment includes a $^{14}C$ detecting device 1, a pressurizing system 2, a mixed solution adding system 3, a pretreating system 4 and a liquid scintillation counter (not shown in FIG. 4).

Figure 5:
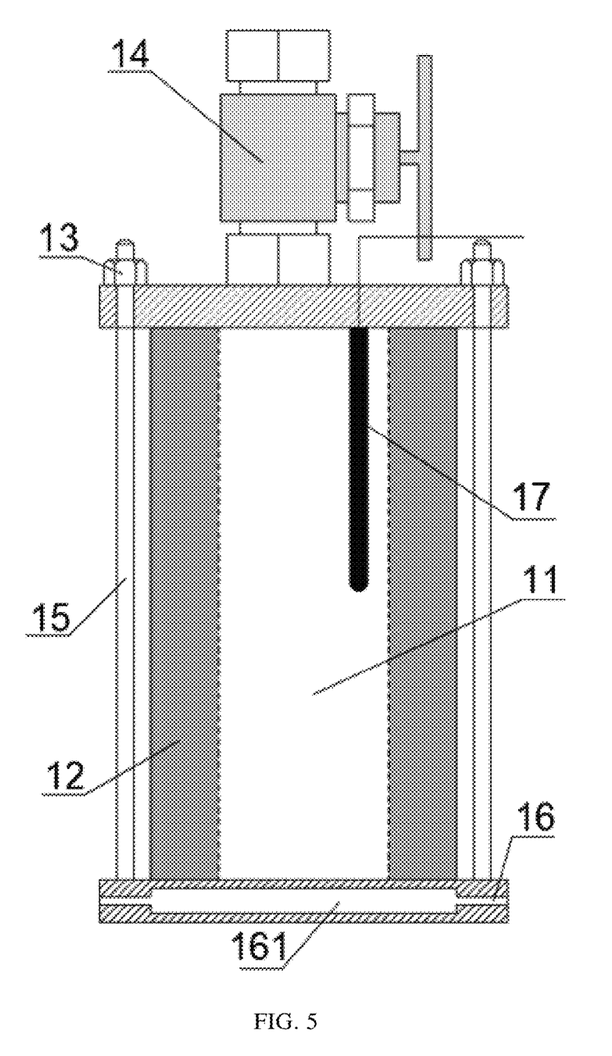
FIG. 5 is a structural schematic view of an exemplary $^{14}C$ detecting device provided by the second embodiment of the present invention.

The $^{14}C$ detecting device is a pressure vessel having light-transmitting zones for containing collected liquid carbon dioxide and mixing various liquid therein, and a specific structure of the $^{14}C$ detecting device 1 is not limited. FIG. 5 shows a structural schematic diagram of an exemplary $^{14}C$ detecting device 1 provided by this embodiment, as shown in FIG. 5, the $^{14}C$ detecting device 1 includes a pressure-bearing housing 12, pressure-bearing plates 16, fixing tie bars 15 and a cooling water channel 161, wherein the pressure-bearing housing 12 defines and forms a light-transmitting cylindrical cavity 11; the pressure-bearing plates 16 are respectively disposed on an upper bottom surface 111 and a lower bottom surface 112 of the cylindrical cavity 11; two ends of the plurality of fixing tie bars 15 are respectively fixed to the pressure-bearing plates 16 on the upper bottom surface 111 and the lower bottom surface 112 of the cylindrical cavity 11; and the cooling water channel 161 is disposed inside at least one of the pressure-bearing plates 16.

Specifically, the light-transmitting pressure-bearing housing 12 is used for containing high-pressure liquid carbon dioxide and providing a passage for fluorescent light to be emitted, the two ends of the fixing tie bar 15 are fixed to the pressure-bearing plate 16 by means of fixing nuts 13, so that the pressure-bearing plate 16 and the pressure-bearing housing 12 form the closed cylindrical cavity 11, and the cylindrical cavity 11 is used for containing the high-pressure liquid carbon dioxide or a mixed solution.

In an exemplary embodiment, the pressure-bearing housing 12 and the pressure-bearing plate 16 are sealed with a perfluorinated gasket, and the perfluorinated gasket has an excellent resistance to liquid carbon dioxide swelling compared with other gaskets.

In an exemplary embodiment, the $^{14}C$ detecting device 1 further includes a high-pressure needle valve 14, and the high-pressure needle valve 14 can be used to charge and discharge carbon dioxide and add a premixed solution in a high-pressure environment.

Figure 6:
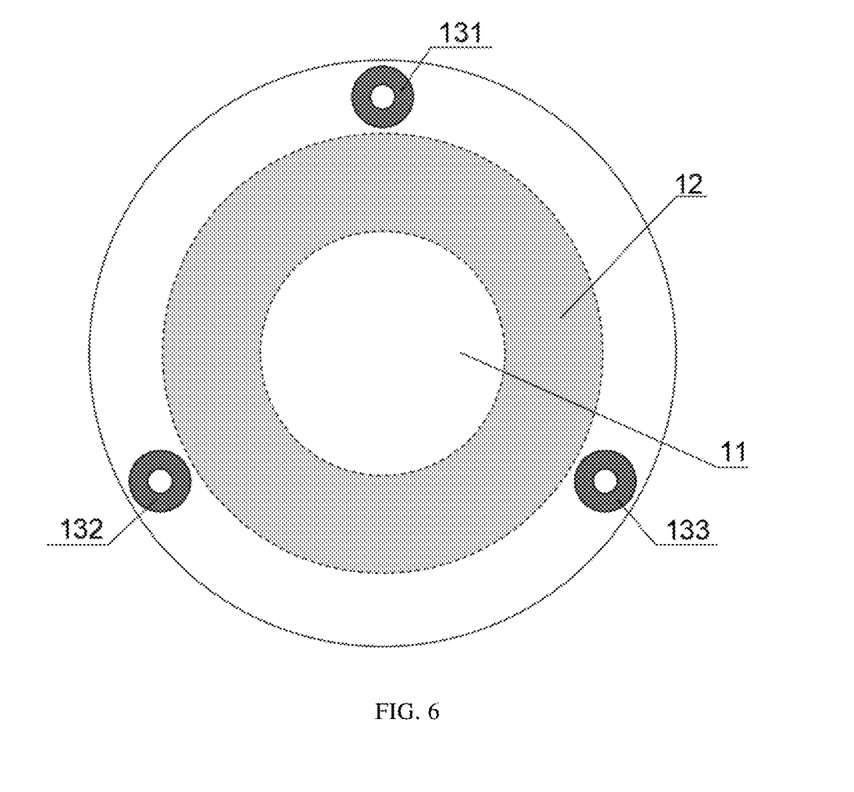
FIG. 6 is a schematic view of a bottom surface of the exemplary $^{14}C$ detecting device provided by the second embodiment of the present invention.

In this embodiment, the pressure vessel may be formed as a vessel which transmits light partially or completely, for example, in some embodiments, the pressure-bearing housing 12 may be an opaque housing made of a pressure-resistant metal material, and optical fiber channels are disposed to be inserted into the pressure vessel through the metal housing to be connected to a solution to be measured, the other end of the optical fiber channel is connected to photomultipliers of the liquid scintillation counter, and the number of the optical fiber channel is determined according to the number of the photomultiplier of the liquid scintillation counter, and is two or three; the end of the optical fiber channel is in a convex lens design and has a light concentrating effect; the inner surface of the pressure vessel is in a high pressure resistant mirror design to enhance the reflection and propagation of the fluorescent light; the fluorescent light generated by the scintillator is specularly reflected by the inner surface of the vessel and then propagates to the end of the optical fiber channel, and after being polymerized by a convex lens, the fluorescent light is transmitted to the photomultiplier through the optical fiber channel for measurement. Alternatively, in some other embodiments, the pressure-bearing housing 12 may be made of a transparent material as a whole, and the opaque fixing tie bars 15 are distributed on the pressure-bearing housing 12, so that the pressure-bearing housing 12 between the fixing tie bars 15 may provide a passage for the fluorescent light to emit out. Further in an exemplary embodiment, referring to FIG. 6, in the $^{14}C$ detecting device 1 of this embodiment, three fixing nuts 13 and three fixing tie bars 15 are uniformly distributed on the pressure-bearing plate 16 in the circumferential direction, so that the fluorescent light can be emitted between the three fixing tie bars 15, and the part of the pressure-bearing housing 12 within each fixing tie bar 15 can be just aligned with the three photomultipliers of the liquid scintillation counter, thereby better facilitating the photomultiplier to capture data of fluorescence scintillation.

As an example, according to the overall design size, the diameter of the $^{14}C$ detecting device 1 can be 48 mm and the height of the $^{14}C$ detecting device 1 can be 105 mm, the size is the size of a sample cell and a measurement cavity of a liquid scintillation counter commonly used today. Under this design size, the $^{14}C$ detecting device 1 can be directly applicable to the liquid scintillation counter without major modifications on the instrument. More specifically, in the radial direction, in order to ensure a safe pressure of up to 10 mPa in the device, the annular thickness of the pressure-bearing housing 12 can be set as 8 mm, the material can be sapphire, and the diameter of the cylindrical cavity 11 is set as 20 mm; in the axial direction, the total height of the device is 105 mm, wherein the design height of the cylindrical cavity 11 and the pressure-bearing housing 12 is 65 mm, the height of both the upper and lower pressure-bearing plates 16 is 5 mm, and the height of the high-pressure needle valve 14 is 30 mm. Under the size design, the volume of the cylindrical cavity 11 is 20.41 mL, and the carbon enrichment degree of the liquid carbon dioxide reaches 165-175 mg/mL, which is enough to meet the requirement of liquid scintillation counting measurement with high accuracy. Under the size design, it can not only meet the need of using the existing liquid scintillation counter to complete the direct and rapid test of the $^{14}C$ activity of carbon dioxide, and eliminate the traditional complex process of making carbon into benzene, but also achieve a very high degree of carbon enrichment, which ensures the accuracy of the test, and saves time and economic costs.

The pressurizing system 2 is in communication with the $^{14}C$ detecting device 1, in an exemplary embodiment, the pressurizing system 2 is in communication with the high-pressure needle valve 14 of the $^{14}C$ detecting device 1, and is used for pressurizing and liquefying gaseous carbon dioxide into liquid carbon dioxide, and introducing the liquid carbon dioxide into the $^{14}C$ detecting device 1 through the high-pressure needle valve 14.

As shown in FIG. 4, the pressurizing system 2 may include a pressurizing pump 21, a high-pressure valve 22, a pressure-bearing pipeline 23, a pressure detector 24 and a pressure control device 25.

The pressurizing pump 21 and the high-pressure valve 22 are connected to the high-pressure needle valve 14 of the $^{14}C$ detecting device 1 via the pressure-bearing pipeline 23, and the gaseous carbon dioxide is pressurized and then injected into the $^{14}C$ detecting device 1. The pressure detector 24 is disposed in the pressure-bearing pipeline 23, and measures a real-time pressure of the pressurizing system 2 so as to obtain the pressurizing rate of the pressurizing system 2; the pressure control device 25 is in communication connection with the pressurizing pump 21 to control the pressurizing rate of the pressurizing pump 21.

In the pressurizing system 2, if the pressurizing rate of carbon dioxide is too high, a large amount of carbon dioxide may be accumulated instantaneously in the $^{14}C$ detecting device 1, resulting in rapid liquefaction of the carbon dioxide, a large amount of heat may be emitted, causing the temperature to rise, and finally the liquid carbon dioxide may be changed into carbon dioxide in a supercritical state or the density thereof may be greatly reduced compared with that of the liquid state, thereby reducing the test accuracy.

Thus, in an exemplary embodiment, a temperature detector 17 is disposed in the $^{14}C$ detecting device 1 for detecting the temperature in the $^{14}C$ detecting device 1 in the pressurizing process, and the pressure control device 25 can receive the detection results of the temperature detector 17 and the pressure detector 24, regulating and controlling the switching and rate of the pressurizing, ensuring the safety and stability of the carbon dioxide pressurizing and liquefying process, and obtaining the liquid carbon dioxide with a carbon enrichment degree as high as possible.

Further in an exemplary embodiment, the cooling water channel 161 is disposed in at least one of the pressure-bearing plates 16, and by introducing cooling water having different temperatures into the cooling water channel 161, it is possible to lower the temperature of the liquid carbon dioxide in the $^{14}C$ detecting device 1, absorb a large amount of heat generated by the liquefaction of carbon dioxide, and at the same time, promote the conversion of gas-phase carbon dioxide into liquid-phase carbon dioxide, thereby improving the density of the liquid carbon dioxide. In addition to the cooling water, a cooling medium introduced may be cold alcohol or the like.

The mixed solution adding system 3 is in communication with the $^{14}C$ detecting device 1, in an exemplary embodiment, in communication with the high-pressure needle vale 14 of the $^{14}C$ detecting device 1 for premixing the scintillator and the cosolvent and introducing the premixed solution of the scintillator and the cosolvent into the $^{14}C$ detecting device 1 through the high-pressure needle vale 14.

As shown in FIG. 4, the mixed solution adding system 3 may include: a premixing cavity 31, a mixed solution adding valve 32, a vacuum valve 33 and a vacuum pump 34. The premixing cavity 31 is used for containing the cosolvent and the scintillator (the premixed solution) mixed in proportion, the mixed solution adding valve 32 can control the connection and disconnection of the premixing cavity 31 with the $^{14}C$ detecting device 1, and the vacuum valve 33 and the vacuum pump 34 are used for evacuating the $^{14}C$ detecting system to a vacuum state so as to prevent impurity gas such as carbon dioxide in air from affecting the activity detection of radiocarbon. After vacuumizing, the premixed solution is pressed into the $^{14}C$ detecting device 1 from the premixing cavity 31 through the mixed solution adding valve 32 under the action of pressure to form a uniform and stable mixed system with the liquid carbon dioxide.

The liquid scintillation counter can be either an existing liquid scintillation counter or a novel liquid scintillation counter which has been designed and transformed; the liquid scintillation counter has a sample cell and a measurement cavity suitable for the $^{14}C$ detecting device 1 to be placed in; the liquid scintillation counter includes two or more photomultipliers, and the photomultiplier is disposed corresponding to the light-transmitting zone of the $^{14}C$ detecting device 1 in the measurement cavity, and can capture scintillation fluorescent light emitted from the light-transmitting zone, realizing activity detection of radiocarbon.

In an exemplary embodiment, the system for directly and rapidly detecting $^{14}C$ of carbon dioxide provided by this embodiment further includes a pretreating system 4, in communication with a gas source of the gaseous carbon dioxide and the pressurizing system 2 for removing impurities of and purifying a gaseous carbon dioxide sample collected from the gas source of the gaseous carbon dioxide and then introducing same into the pressurizing system 2.

Specifically, as shown in FIG. 4, the pretreating system 4 may include a vacuum pump 41, a gaseous carbon dioxide gas source 42, a gas valve 43, a solid phase impurity removing system 44, a gas phase impurity removing system 45 and a mass flow controller 46. The vacuum pump 41 is used for evacuating impurity gas in the pretreating system 4 to prevent impurity gas such as carbon dioxide in air from affecting the activity detection of radiocarbon. The gaseous carbon dioxide is pumped out of the gaseous carbon dioxide gas source 42, such as a flue gas pipeline, under the action of the pressurizing pump 21 of the pressurizing system 2, and is injected into the $^{14}C$ detecting device 1 through the high-pressure needle valve 14 under the flow control action of the mass flow controller 46 after passing through the gas valve 43, the solid phase impurity removing system 44 and the gas phase impurity removing system 45 in sequence to remove particulate matter and gas-phase impurities. The mass flow controller 46 may be in linkage with the pressure control device 25 in the pressurizing system 2 to control the pressurizing rate, preventing over-temperature or over-pressure within the 14C detecting device 1. In this embodiment, the pressurizing system 2 may perform the pressurizing step S1, wherein gaseous carbon dioxide enters the system for directly and rapidly detecting $^{14}C$ of carbon dioxide from the pressurizing system 2, and is pressurized and liquefied by the pressurizing system 2 to obtain the liquid carbon dioxide; on the other hand, the mixed solution adding system 3 may perform the first mixing step S21, wherein a scintillation solution is mixed with the cosolvent in the mixed solution adding system 3 to form the premixed solution.

Then, the second mixing step S22 is performed, the pressurizing system 2 and the mixed solution adding system 3 inject the liquid carbon dioxide and the premixed solution into the $^{14}C$ detecting device 1, and the premixed solution and the liquid carbon dioxide are mixed in the $^{14}C$ detecting device 1 so as to obtain the mixed solution, without mixing steps such as stirring and heating.

Finally, the detecting step S3 is performed, the $^{14}C$ detecting device 1 is placed in the sample cell and the measurement cavity of the liquid scintillation counter, after radioactive decay of the liquid carbon dioxide in the mixed solution occurs, the decay energy is absorbed by the scintillator, and then fluorescent light is emitted, and transmits through the transparent zone of the $^{14}C$ detecting device 1 to be captured by the photomultiplier of the liquid scintillation counter to carry out a radiocarbon test.

The description is only exemplary embodiments of the present invention and not intended to limit the present invention. Any modification, equivalent replacement, or improvement made within the spirit and principle of the present invention shall fall within the protection scope of the present invention.

The invention claimed is:

1. A method for directly and rapidly detecting $^{14}C$ of carbon dioxide, comprising:
   pressurizing and liquefying gaseous carbon dioxide to obtain liquid carbon dioxide;
   mixing the liquid carbon dioxide with a cosolvent and a scintillator in a pressure vessel to obtain a mixed solution; and
   placing the pressure vessel in a liquid scintillation counter for carrying out a detection of a radiocarbon activity.

2. The method for directly and rapidly detecting $^{14}C$ of carbon dioxide according to claim 1, wherein the mixing the liquid carbon dioxide with the cosolvent and the scintillator in the pressure vessel to obtain the mixed solution comprises:
   a first mixing step for mixing the cosolvent and the scintillator to obtain a premixed solution; and
   a second mixing step for mixing the premixed solution with the liquid carbon dioxide in the pressure vessel to obtain the mixed solution.

3. The method for directly and rapidly detecting $^{14}C$ of carbon dioxide according to claim 2, wherein in the first mixing step, a mixing ratio of the scintillator to the cosolvent is 12-15 mg/mL.

4. The method for directly and rapidly detecting $^{14}C$ of carbon dioxide according to claim 2, wherein in the first mixing step, the scintillator is an organic solid scintillator, the cosolvent is an organic solvent, and a $^{14}C$ activity of a carbon element in both the scintillator and the cosolvent is zero.

5. The method for directly and rapidly detecting $^{14}C$ of carbon dioxide according to claim 2, wherein in the second mixing step, a volume ratio of the premixed solution to the liquid carbon dioxide is 1:5 to 1:6.

6. The method for directly and rapidly detecting $^{14}C$ of carbon dioxide according to claim 1, wherein in the pressurizing and the liquefying the gaseous carbon dioxide to obtain the liquid carbon dioxide, a pressurizing rate of the gaseous carbon dioxide is controlled according to a temperature and a pressure of the liquid carbon dioxide.

7. The method for directly and rapidly detecting $^{14}C$ of carbon dioxide according to claim 1, further comprising:
pretreating by removing impurities of and purifying a gaseous carbon dioxide sample.

8. The method for directly and rapidly detecting $^{14}C$ of carbon dioxide according to claim 1, wherein the pressure vessel comprises:
a pressure-bearing housing, the pressure-bearing housing defining and forming a light-transmitting cylindrical cavity;
pressure-bearing plates, the pressure-bearing plates being respectively disposed on an upper bottom surface and a lower bottom surface of the light-transmitting cylindrical cavity;
a plurality of fixing tie bars, two ends of the plurality of fixing tie bars being respectively fixed to the pressure-bearing plates on the upper bottom surface and the lower bottom surface of the light-transmitting cylindrical cavity; and
a cooling water channel, disposed inside at least one of the pressure-bearing plates.

* * * * *